Feb. 13, 1951  C. M. RIHA  2,541,781
SHRIMP CLEANER
Filed March 17, 1948

Inventor
Cyril M. Riha
by Parker & Carter
Attorneys.

Patented Feb. 13, 1951

2,541,781

UNITED STATES PATENT OFFICE 2,541,781

SHRIMP CLEANER

Cyril M. Riha, Atlanta, Ga., assignor to Design Development Corporation, Atlanta, Ga., a corporation of Georgia Application March 17, 1948, Serial No. 15,441

8 Claims. (Cl. 17—7)

My invention relates to improvements in shrimp cleaners, and has for its object to provide a convenient, readily manipulatable hand cleaning tool which can be used to remove the black vein or gut from the shrimp after the shell has been stripped off.

My invention is illustrated more or less diagrammatically in the accompanying drawing, wherein.

Like parts are indicated by like characters in the specification and drawings.

Figure 1:
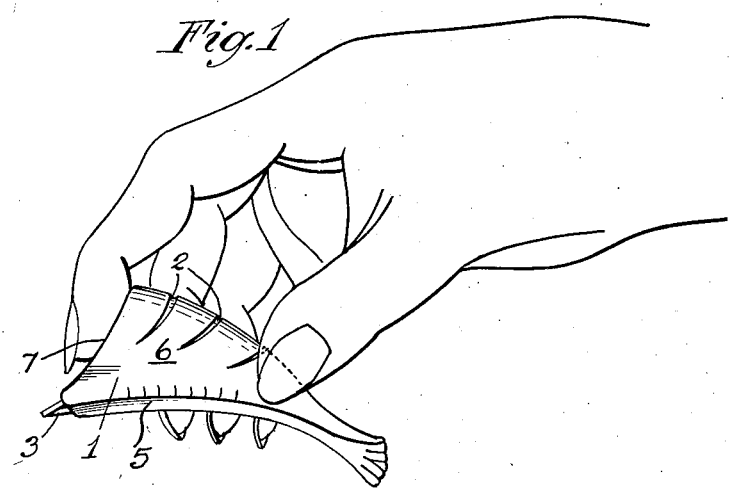
Figure 1 is a perspective view of the invention.
Figure 2:
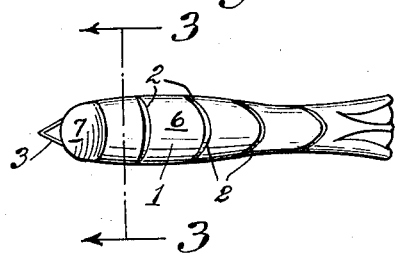
Figure 2 is a plan view.
Figure 3:
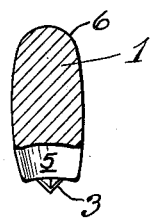
Figure 3 is a section along the line 3—3 of Figure 2.
Figure 4:
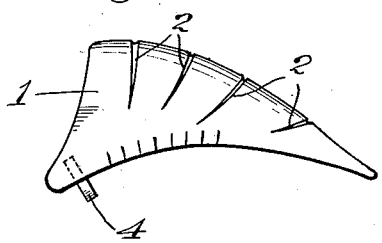
Figure 4 is a side elevation of a modified form of the device.
Figure 5:
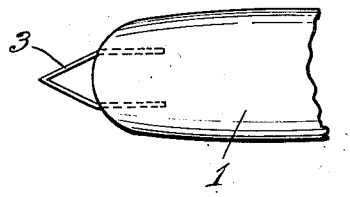
Figure 5 is a view on an enlarged scale showing the detail of the cutting spear.

1 is the body of the shrimp cleaner. It is generally triangular in shape, when viewed in side elevation as shown in Figs. 3 and 4. It is provided with a bottom face 5 which is curved longitudinally, as indicated in Figure 4, and is also slightly concave as indicated in Figure 3. If desired it may be generally shaped in the form of a shrimp. The surface portion of the top face 6 of the body 1 may be provided with grooves 2, which simulate the scales on the shrimp, form an antifriction grip for the cleaner. A forward face 7 is provided on the body portion 1 and said face is slightly concave both longitudinally and transversely, to provide a gripping surface for a finger of the operator, as clearly shown in Fig. 1. The spear which removes the black vein projects from the forward end of the cleaner, as shown at 3. The spear is made of thin, sharpened wire bent as indicated in Figure 5 to provide a cutting loop. This loop projects forwardly from the body of the cleaner and is slightly inclined downwardly so that when the operator holds the cleaner in one hand and the shrimp in the other and brings them together, sliding the cleaner longitudinally along the body of the shrimp, causes the spear to penetrate the meat sufficiently to cut out and remove the black vein which is located along the side of the shrimp body near the surface.

In the modified form shown in Figure 4, the spear, instead of projecting forwardly from the end of the cleaner body, projects downwardly as indicated at 4. This latter arrangement gives a somewhat deeper penetration into the body of the shrimp, but the function is identical in each case, because the shrimp and the shrimp cleaner body are moved by the operator with respect to each other so that the gut is cut out and removed by the sharpened spear loop.

I claim:

1. A shrimp cleaner comprising a solid body portion, generally greater in length and height than in width, and provided with faces, one face of said body portion being concave in longitudinal cross section and in transverse cross section and a spear extending from the forward end of said concave face for a distance substantially equal to half the width of said body portion.

2. The structure of claim 1 characterized by and including a spear formed of a wire loop having two straight sides intersecting at a sharp angle beyond the body.

3. The structure of claim 1 characterized by and including a spear formed in a loop and having two straight sides intersecting at a sharp angle beyond the body, said straight sides of the loop being provided with sharpened edges.

4. The structure of claim 1 characterized by and including a spear having two straight sides intersecting at a sharp angle beyond the body, said straight sides being connected to said concave face at points inwardly spaced from the longitudinal edges of said face.

5. The structure of claim 1 characterized by and including a spear extending downwardly from the forward end of said concave face at substantially a right angle to that portion of said face to which it is connected.

6. The structure of claim 1 characterized by a hand-hold portion on said body portion opposite said concave bottom face adapted to be grasped by the user's hand and a spear extending from one end of said concave face at a point opposite said hand-hold portion.

7. A shrimp cleaner comprising a solid body portion generally triangular in shape when viewed in side elevation, said body being substantially greater in length than in width, and being provided with bottom, top, and forward faces, the bottom face of said body portion being concave in both longitudinal and transverse cross section, the top face of said body portion being convex in both longitudinal and transverse cross section, a forward face of said body portion being concave in both longitudinal and transverse cross section, said bottom and top faces converging rearwardly toward a point opposite said forward face and a spear extending from one end of said bottom face for a distance substantially equal to half the width of said first named face.

8. The structure of claim 7 characterized by and including grooves on said top face whereby a gripping surface is provided.

CYRIL M. RIHA.

REFERENCES CITED

The following references are of record in the file of this patent:

UNITED STATES PATENTS

| Number | Name | Date |
|---|---|---|
| 826,266 | Newman | July 17, 1906 |
| 1,502,743 | Page | July 29, 1924 |
| 2,089,605 | Hardy | Aug. 10, 1937 |

FOREIGN PATENTS

| Number | Country | Date |
|---|---|---|
| 230,885 | Germany | Feb. 8, 1911 |